(12) United States Patent
Lim et al.

(10) Patent No.: US 7,978,066 B2
(45) Date of Patent: Jul. 12, 2011

(54) NAVIGATION APPARATUS AND METHOD USING RFID

(75) Inventors: Hyuk Lim, Gwangju (KR); Jae-Hyung Jang, Gwangju (KR); Yung-Kwan Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 550 days.

(21) Appl. No.: 12/038,703

(22) Filed: Feb. 27, 2008

(65) Prior Publication Data

US 2008/0266106 A1   Oct. 30, 2008

(30) Foreign Application Priority Data

Apr. 30, 2007   (KR) .................. 10-2007-0041979

(51) Int. Cl.
*G08B 1/08* (2006.01)
(52) U.S. Cl. ........... 340/539.13; 340/286.05; 340/572.1; 340/988
(58) Field of Classification Search .... 340/572.1–572.8, 340/539.11–539.21, 286.05, 988; 342/420, 342/465; 455/456.1, 457; 700/245
See application file for complete search history.

(56) References Cited

U.S. PATENT DOCUMENTS

| | | | | |
|---|---|---|---|---|
| 7,274,294 B2* | 9/2007 | Heinze et al. | .............. | 340/572.1 |
| 7,420,510 B2* | 9/2008 | Kolavennu et al. | .......... | 342/465 |
| 7,728,729 B2* | 6/2010 | Christopher | .............. | 340/572.1 |
| 2003/0236590 A1 | 12/2003 | Park et al. | | |
| 2006/0022030 A1* | 2/2006 | Boothroyd | .................... | 235/375 |
| 2006/0022038 A1* | 2/2006 | Hewlin et al. | ................. | 235/385 |
| 2006/0135183 A1* | 6/2006 | Zavada et al. | ................. | 455/457 |
| 2006/0208888 A1* | 9/2006 | Patel et al. | ................. | 340/572.1 |
| 2007/0001904 A1* | 1/2007 | Mendelson | .................... | 342/450 |

FOREIGN PATENT DOCUMENTS

EP   1610258 A1   12/2005

OTHER PUBLICATIONS

Lionel M. Ni, et al., "Landmarc: Indoor Location Sensing Using Active RFID", Proceedings of the First IEEE International Conference on Pervasive Computing and Communication (PerCom'03), IEEE Computer Society, 2003.
Xiaotao Liu, et al., "Ferret: RFID Localization for Pervasive Multimedia", Department of Computer Science, University of Massachusetts, Amherst, MA.

\* cited by examiner

*Primary Examiner* — Brent Swarthout

(57) ABSTRACT

Disclosed is a navigation apparatus and method using RFID that is capable of providing information on a current position and a moving direction to the destination. An antenna unit has directivity in a predetermined direction and receives at least one radio signal transmitted from at least one RFID tag. An RFID reader converts the at least one radio signal provided by the antenna unit into information on the at least one RFID tag in a digital form, measures the reception strength of the at least one radio signal, and provides the information on the at least one RFID tag and information on the received strength. A control unit determines the current position and moving direction on the basis of the information on the at least one RFID tag and the information on the reception strength provided from the RFID reader. Accordingly, it is possible to accurately recognize the current position and the moving direction of the navigation apparatus and guide the moving direction to the destination.

15 Claims, 7 Drawing Sheets

NAVIGATION APPARATUS AND METHOD USING RFID

BACKGROUND OF THE INVENTION

1. Technical Field

The present invention relates to a navigation apparatus and a navigation method, and more particularly, to a navigation apparatus and a navigation method using RFID (Radio Frequency Identification) that is capable of guiding a path to the destination using RFID.

2. Related Art

An RFID technology is to recognize information and the surrounding environment on various objects from tags attached to the objects using a RF signal, that is, a radio frequency and collecting, storing, processing, and tracking the information on the objects to provide various services, such as position measurement of the objects, a remote process and management on the objects, and information exchange between the objects. The RFID technology complements disadvantages of existing bar code systems and accelerates informatization of the objects, and thus has been actively used as a core technology of a ubiquitous sensor network (USN).

In recent years, the use of the RFID technology has been progressively spread. For example, the RFID technology has been used in a factory automation field, a traffic field, a medical treatment field, or a leisure or facility management field, specifically, in a baggage handling system to manage physical distribution at an airport, a container handling system to manage harbors, and a medical managing system to provide a POC (Point Of Care) service.

Korean Patent No. 10-478-452 (title of the invention: LOCALIZATION APPARATUS AND METHOD FOR MOBILE ROBOT) discloses an apparatus and method that is capable of unitively operating an audiometry coordinate system and an RFID coordinate system and recognizing a position and direction of a mobile robot.

However, Korean Patent No. 10-478-452 is disadvantageous in that, since the absolute coordinates for a current position are acquired using the RFID coordinate system and the relative coordinates for the current position are acquired using the audiometry coordinate system, coordinate axes of the audiometry coordinate system and the RFID coordinate system need to be aligned, which requires a complicated calculation process in aligning the coordinate axes.

Korean Patent No. 10-478-452 discloses only an apparatus and method that is capable of recognizing the current position and direction of the mobile robot. However, Korean Patent No. 10-478-452 does not disclose a navigation function of displaying GIS (Geographic Information System) information on the current position of the mobile robot and guiding a path to the destination.

European Laid-opened Publication No. EP 1610258 (title of the invention: RFID COMMUNICATION APPARATUS WITH TAG POSITION DETECTION MEANS) discloses an apparatus and method that is capable of estimating an input direction of a radio wave transmitted from an RFID tag through at least one antenna, calculating a position of the RFID tag on the basis of the estimated input direction to determine the position of the RFID tag, and communicating with the RFID tag at the determined position.

European Laid-opened Publication No. EP 1610258 discloses an apparatus and method that is capable of determining a position of an RFID tag to enable a communication between the RFID tag and an RFID reader, but does not disclose an apparatus and method that is capable of providing a current position of a navigation apparatus and a moving direction to guide a path to the destination.

SUMMARY OF THE INVENTION

The invention has been finalized in order to solve the above-described problems. It is an object of the invention to provide a navigation apparatus using RFID that is capable of providing current positional information and a moving direction to the destination.

It is another object of the invention to provide a navigation method using RFID that is capable of current positional information and a moving direction to the destination.

According to an aspect of the invention, a navigation apparatus using RFID includes an antenna unit that has directivity in a predetermined direction and receives at least one radio signal transmitted from at least one RFID tag; an RFID reader that converts the at least one radio signal provided by the antenna unit into information on the at least one RFID tag in a digital form, measures the reception strength of the at least one radio signal, and provides the information on the at least one RFID tag and information on the received strength; and a control unit that determines a current position and a moving direction on the basis of the information on the at least one RFID tag and the information on the reception strength provided from the RFID reader.

The control unit may extract the distance between the at least one RFID tag and the navigation apparatus and a direction where the at least one RFID tag is disposed on the basis of the information on the reception strength, and may use the extracted distance and direction and positional information of the at least one RFID tag included in the information on the at least one RFID tag to determine the current position.

The control unit may compare the information on the at least one RFID tag with a list of RFID tags provided on a moving path to the destination, may read RFID tag information matched with the list of RFID tags among the information on the at least one RFID tag, and may determine the moving direction on the basis of a direction where the RFID tag corresponding to the read RFID tag information is installed.

The control unit may interlock the current position and the moving direction with GIS (Geographic Information System) information corresponding to the current position and the moving direction and may display the current position and the moving direction together with the GIS information.

The information on the reception strength may indicate the reception electric field strength of the at least one radio signal received from the antenna unit.

The antenna unit may include three directional antennas that are respectively installed to have directivity in different directions at the front of the navigation apparatus and at an angle in a range of 45 to 90 degrees with respect to the front.

The antenna unit may be one of an antenna having a beamforming function capable of radiating radio waves in a desired direction or receiving the radio waves from the desired direction and a smart antenna.

The information on the at least one RFID tag may include at least one of unique identification information of the RFID tag, installation position information thereof, and GIS (Geographic Information System) information.

The navigation apparatus according to the aspect of the invention may further include a display unit that receives the current position and the moving direction from the control unit and displays the current position and the moving direction; a storage unit that stores a list of RFID tags installed on a moving path to the destination and GIS (Geographic Information System) information corresponding to the list of RFID tags; and a communication interface that sets connection with an external apparatus and provides data received from the external apparatus to the control unit.

The list of RFID tags may include at least one of positional information and topologic information of each of the RFID tags, data used to interlock the information of each of the RFID tags with its corresponding GIS information, and information used to describe a position of each of the RFID tags.

According to another aspect of the invention, there is provided a navigation method using RFID that guides a current position and a moving direction to the destination. The navigation method includes recognizing at least one RFID tag; recognizing the current position of the navigation apparatus on the basis of information on the at least one RFID tag and information on the reception strength of a radio signal transmitted from the at least one RFID tag; and comparing the information on the at least one RFID tag with a list of RFID tags installed on a moving path to the destination and determining the moving direction of the navigation apparatus.

The recognizing of the current position may be extracting the distance between the at least one RFID tag and the navigation apparatus and a direction where the at least one RFID tag is disposed on the basis of the information on the reception strength, and using the extracted distance and direction and positional information of the at least one RFID tag included in the information on the at least one RFID tag to recognize the current position.

The recognizing of the current position may include simultaneously displaying the recognized current position and GIS (Geographic Information System) information corresponding to the recognized current position.

The determining of the moving direction may be comparing the information on the at least one RFID tag with the list of RFID tags provided on the moving path to the destination, reading RFID tag information matched with the list of RFID tags among the information on the at least one RFID tag, and determining the moving direction on the basis of a direction where the RFID tag corresponding to the read RFID tag information is installed.

The determining of the moving direction may include simultaneously displaying the determined moving direction and GIS (Geographic Information System) information corresponding to the determined moving direction.

The navigation method according to another aspect of the invention may further include receiving a list of RFID tags in a predetermined area and GIS (Geographic Information System) information from an external apparatus.

When an error occurs in recognizing the at least one RFID tag, the error may be corrected on the basis of error determination and control measures stored in advance, and the recognition of the at least one RFID tag may be performed again.

In the invention, various modifications and changes may be made and various embodiments may be embodied. The embodiments thereof will be described in detail with reference to the attached drawings.

However, it will be understood that it is not intended to limit the invention to the embodiments, and the invention includes all the modifications, changes, equivalents, and substitutes within the scope and technical range of the invention.

It will be understood that the terms first, second, etc. may be used to describe various elements, but the elements should not be limited by these terms. These terms are only used to distinguish one element from another element. Thus, the first element can be termed the second element and the second element can be named the first element without departing from the scope of the invention. As used herein, the term "and/or" includes any and all combinations of one or more of the associated listed items.

DESCRIPTION OF EXEMPLARY EMBODIMENT

Hereinafter, exemplary embodiments of the invention will be described in detail with reference to the accompanying drawings. It should be noted that the same components are represented by the same reference numerals even if they are shown in different drawings. The repetitive description of the same components is omitted.

Figure 1:
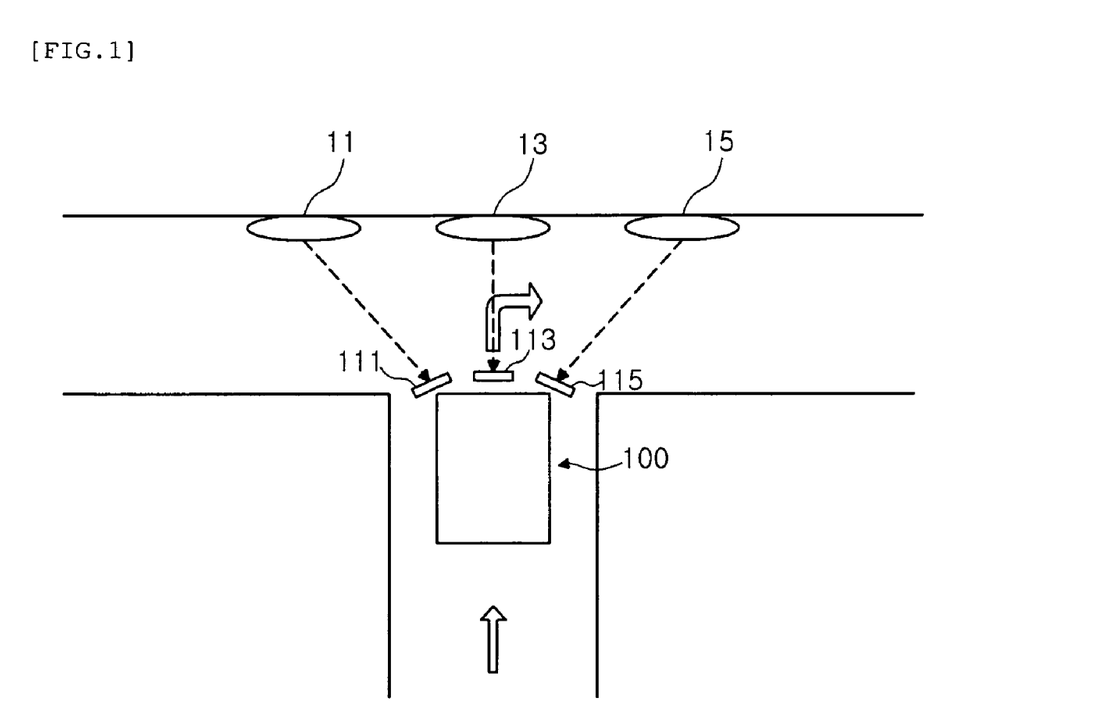
FIG. 1 is a conceptual diagram illustrating an operation principle of a navigation method using RFID according to an embodiment of the invention.

FIG. 1 is a conceptual diagram illustrating an operation principle of a navigation method using RFID according to an embodiment of the invention.

Referring to FIG. 1, a navigation apparatus 100 is disposed at a position that needs to determine a moving direction to the left or right on a T-shaped road, and three RFID tags 11, 13, and 15 are installed in front of a forked load.

The navigation apparatus 100 includes three directional antennas 111, 113, and 115 that are provided at a predetermined angle to face different directions. Each of the directional antennas 111, 113, and 115 has directivity in a direction where each antenna is provided, and maximally induces radio signals transmitted from each of the RFID tags 11, 13, and 15 disposed in directions where the individual antennas 111, 113, and 115 are provided. For example, the three directional antennas 111, 113, and 115 may be provided on the front of the navigation apparatus 100 and the left and right of the front of the navigation apparatus 100 at an angle in a range of 45 to 90 degrees, respectively, such that the three directional antennas each have directivity in a different direction.

That is, among the radio signals received from the antenna 111, the reception strength of the radio signal transmitted from the RFID tag 11 is strongest, and among the radio signals received from the antenna 113, the reception strength of the radio signal transmitted from the RFID tag 13 is strongest. Further, among the radio signals received from the antenna 115, the reception strength of the radio signal transmitted from the RFID tag 15 is strongest. In this case, the reception strength may be the electric field strength of the received radio signal.

The navigation apparatus 100 may extract information on the distances between the current position of the navigation apparatus 100 and the RFID tags 11, 13, and 15 to be installed and the directions where the RFID tags 11, 13, and 15 are installed, on the basis of positional information of the RFID tags 11, 13 provided from the RFID reader 120, and reception strength information of the radio signals that are received from the antennas 111, 113, and 115.

In addition, the navigation apparatus 100 recognizes the current position and determines a moving direction from the current position to the destination on the basis of the positional and directional information of the RFID tags 11, 13, and 15.

For example, in an environment shown in FIG. 1, since the reception strength of the radio signal transmitted from the RFID tag 11 is strongest in the signals induced by the antenna 111, the navigation apparatus 100 determines that the RFID tag 11 is disposed in the same direction as a direction where the antenna 111 has directivity, that is, on the left of the navigation apparatus 100. Since the reception strength of the radio signal transmitted from the RFID tag 13 is strongest in the signals induced by the antenna 113, the navigation apparatus 100 determines that the RFID tag 13 is disposed in the same direction as a direction where the antenna 113 has directivity, that is, on the front of the navigation apparatus 100. Furthermore, since the reception strength of the radio signal transmitted from the RFID tag 15 is strongest in the signals induced by the antenna 115, the navigation apparatus 100 determines that the RFID tag 15 is disposed in the same direction as a direction where the antenna 115 has directivity, that is, on the right of the navigation apparatus 100.

In addition, the navigation apparatus 100 compares the recognized RFID tag information with a list of RFID tags stored in a navigation database, reads RFID tag information matched with the list of RFID tags among the recognized RFID tag information, determines a direction where the RFID tag corresponding to the read RFID tag information is installed as a moving direction, and displays the moving direction through a display unit and/or instructs the moving direction by outputting a sound through a sound output unit.

In this case, the list of RFID tags means a list of RFID tags that is installed on a moving path reaching the destination.

For example, if the read RFID tag information is matched with information on the RFID tag 15 received from the antenna 115, the navigation apparatus 100 determines a right direction where the RFID tag 15 is installed as a moving direction, and provides the moving path to a user through the display unit and/or the sound output unit to move from the current position to the right.

Figure 2:
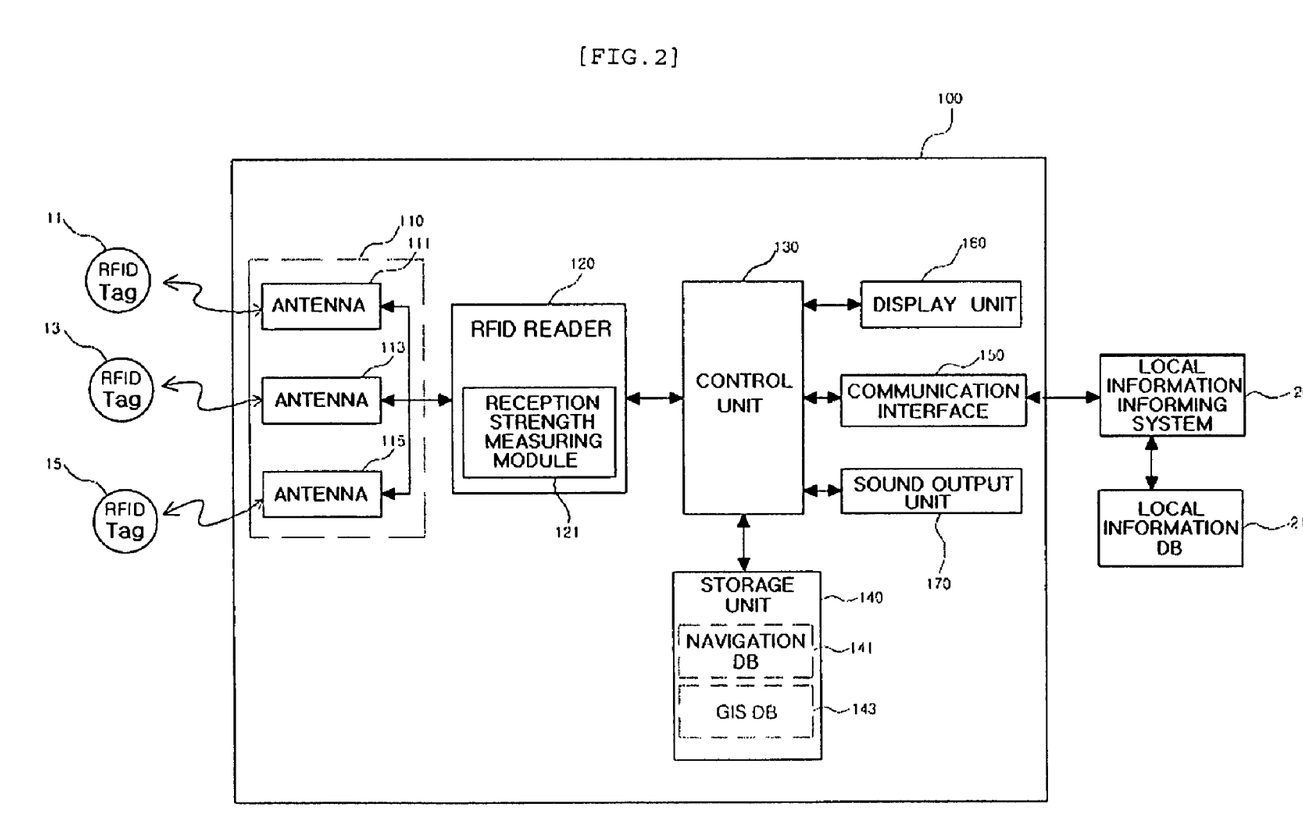
FIG. 2 is a block diagram illustrating a structure of a navigation apparatus using RFID according to an embodiment of the invention.
Figure 3:
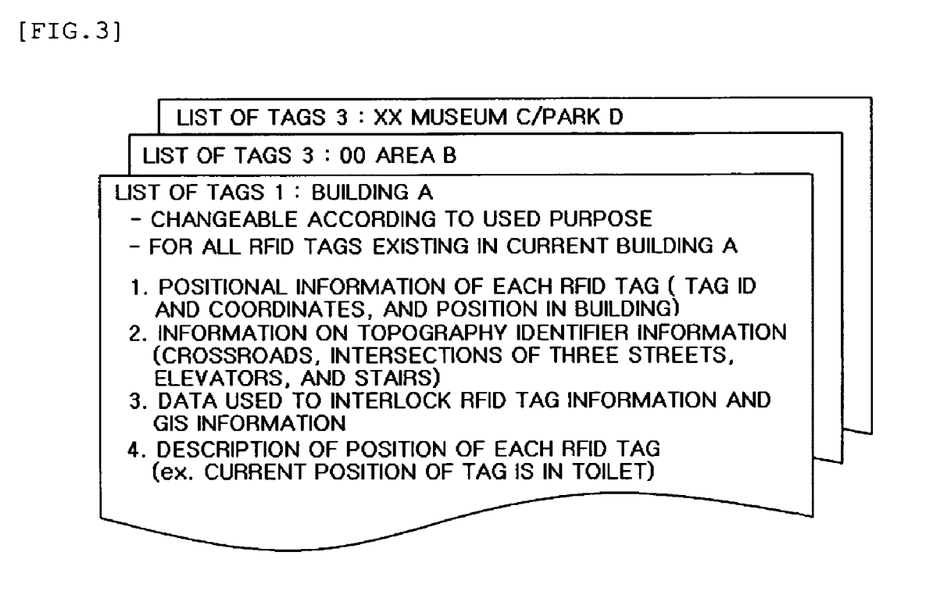
FIG. 3 is a diagram illustrating a list of RFID tags that is included in a navigation database shown in FIG. 2.

FIG. 2 is a block diagram illustrating a structure of a navigation apparatus using RFID according to an embodiment of the invention, and FIG. 3 is a diagram illustrating a list of RFID tags that is included in a navigation database shown in FIG. 2.

Referring to FIGS. 2 and 3, the navigation apparatus 100 includes an antenna unit 110, an RFID reader 120, a control unit 130, a storage unit 140, a communication interface 150, a display unit 160, and a sound output unit 170.

The antenna unit 110 includes one or more antennas 111, 113, and 115. Each of the antennas 111, 113, and 115 may be composed of a direction antenna that is designed such that each antenna radiates a radio signal in a predetermined direction or induces the radio signal in the predetermined direction.

In particular, one or more antennas 111, 113, and 115 included in the antenna unit 110 are provided to have directivity in different directions in the navigation apparatus 100, and induce the radio signals transmitted from the RFID tags 11, 13, and 15 disposed in different directions and provide the induced signals to the RFID reader 120.

Further, when each of the RFID tags 11, 13, and 15 is a passive tag that does not include a separate power supply, one or more antennas 111, 113, and 115 that are included in the antenna unit 110 transmit predetermined radio signals in directions where the antennas 111, 113, and 115 have directivity, according to the control of the RFID reader 120, and receive radio waves from the RFID tags inductively coupled to the transmitted radio signals and provide the radio waves to the RFID reader 120.

In FIG. 2, one or more antennas 111, 113, and 115 that are included in the antenna unit 110 are exemplified as directional antennas, respectively. However, in another embodiment of the invention, the antenna unit 110 may include an antenna having a beamforming function capable of radiating a radio wave in a desired direction or receiving a radio wave from a desired direction or a smart antenna and may perform the same function as the antenna unit 110 in the above-described embodiment.

Since the general structure of the RFID reader 120 is well-known, it is not shown in detail in the drawings. However, the RFID reader 120 may include a microcontroller, an oscillator, a power amplifier, a peak detector, a filter, an amplifier, a shaping circuit, or the like. The RFID reader 120 receives a radio signal in an analog form from each of the antennas 111, 113, and 115, processes the received radio signal to convert the radio signal into RFID tag information in a digital form, and provides the RFID tag information to the control unit 130.

In this case, the RFID tag information is information that is included in the radio signals transmitted from the RFID tags 11, 13, and 15, and may include information on unique identifiers and installation positions of the RFID tags, and GIS (geographic information system) information.

Further, the RFID reader 120 may include a reception strength measuring module 121. The reception strength measuring module 121 measures the reception strength of the radio signal provided from each of the antennas 111, 113, and 115 included in the antenna unit 110, and provides information on the measured reception strength of the radio signal to the control unit 130.

In this case, the reception strength measuring module 121 can measure the electric field strength of the received radio signal. Hereinafter, it is assumed that the reception strength measuring module 121 measures the electric field strength.

The control unit 130 recognizes the current position of the navigation apparatus 100 on the basis of the RFID tag information and electric field strength information in a digital form provided from the RFID reader 120, and interlocks the recognized current position with GIS information (for example, map information) and displays the current position and the GIS information through the display unit 160.

Further, the control unit 100 determines a moving direction from the current position to the destination on the basis of the RFID tag information and electric field strength information, and displays the determined moving direction through the display unit 160 or instructs the moving direction by outputting a sound through the sound output unit 170.

Specifically, the control unit 130 recognizes the current position of the navigation apparatus 100 on the basis of the positional information of at least one RFID tag included in the RFID tag information provided from the RFID reader 120 and the electric field strength information provided from the reception strength measuring module 121. In addition, the control unit 130 reads GIS information corresponding to the recognized current position from a GIS database 143 and simultaneously displays the GIS information and the current position of the navigation apparatus 100 through the display unit, such that the current position of the navigation apparatus 100 and the GIS information are interlocked with each other and displayed.

The control unit 130 extracts information on directions where the recognized RFID tags are installed on the basis of the positional information of the RFID tags included in the RFID tag information and the electric field strength information.

The control unit 130 compares the information on the recognized RFID tags with a list of RFID tags including information on all the RFID tags existing on a moving path reaching the destination. Then, the control unit 130 reads RFID tag information matched with the list of RFID tags among the information on the recognized RFID tags, and determines a direction where the RFID tag, which corresponds to the read RFID tag information, that is, has transmitted the read RFID tag information, is installed as a moving direction. Then, the control unit 130 displays the moving direction through the display unit 160 and/or instructs the moving direction by outputting a sound through the sound output unit 170.

The control unit 130 receives the list of RFID tags and/or the GIS information from the external apparatus through the communication interface 150, and stores the list of RFID tags in a navigation database 141 and the GIS information in a GIS database 143.

When the navigation apparatus 100 enters a predetermined area, the control unit 130 may automatically or manually communicate with a local information informing system 20 installed in the predetermined area through the communication interface 150, and receive the list of RFID tags provided in the predetermined area and/or the GIS information (for example, local maps or internal maps of buildings) associated with the RFID tags from the local information informing system 20.

In this case, the list of RFID tags may be a list of RFID tags installed in the predetermined area, and the GIS information may be a local map of the predetermined area or an internal map of a building. When a user sets the destination, the list of RFID tags may be a list of RFID tags installed on a moving path from the current position to the destination, or may be sequentially disposed along the moving path from the current position to the destination.

In this case, the RFID tag may include geographic information, such as positions and coordinates, and may include topographical information, such as crossroads, intersections of three streets, or steep curves, in the case of the RFID tag installed outdoors. The RFID tag may include information on structures, such as stairs, elevators, or doors, in the case of the RFID tag installed indoors. The GIS information is a map that is interlocked with the positions and/or coordinates of the RFID tags. When displaying the position and the moving direction of the navigation apparatus 100 on the basis of the information on the coordinates or positions obtained through the RFID tags, the current position and moving direction of the navigation apparatus 100 may be displayed on the map.

For example, when the navigation apparatus 100 is used to guide the fifth-floor building, a user holds the navigation apparatus 100 and enters the building. In this case, the control unit 130 communicates with the local information informing system 20 installed in the building through the communication interface 150, and receives a list of RFID tags installed in the building and GIS information indicating an internal map of the building from the local information informing system 20. The control unit 130 stores the list of RFID tags in the navigation database 141 and the GIS information in the GIS database 143.

Then, when the navigation apparatus 100 moves to another position, one or more antennas 111, 113, and 115 having directivity, which are installed in the navigation apparatus 100, receive radio signals from the RFID tags 11, 13, and 15 provided in the corresponding directions, respectively. Then, one or more antennas 111, 113, and 115 provide the received radio signals to the RFID reader 120, which converts the received radio signals into RFID tag information in a digital form and provides the RFID tag information to the control unit 130. The control unit 130 recognizes the current position of the navigation apparatus 100 on the basis of the electric field strength information and information on the positions, coordinates, topographies, and structures of the RFID tags 11, 13, and 15 included in the RFID tag information provided by the RFID reader 120. The control unit 130 reads the GIS information corresponding to the current position from the GIS database 143 and simultaneously displays the GIS information and the current position through the display unit.

When a user sets the predetermined destination in the building, the control unit 130 refers to the navigation database 141 and reads information on RFID tags installed on a moving path along which the navigation apparatus 100 moves from the current position to the destination. Then, the control unit 130 determines the direction where the RFID tags corresponding to the read information on the RFID tags are provided as a moving direction, and displays the moving direction through the display unit 160 and/or instructs the moving direction by outputting a sound through the sound output unit 170.

The storage unit 140 includes the navigation database 141 and the GIS database 143.

The navigation database 141 includes a list of RFID tags that is provided on a moving path from the current position of the navigation apparatus 100 to the destination. As shown in FIG. 3, the list of RFID tags may include positional information of each RFID tag (for example, the unique identification number of each RFID tag, the geographic coordinates of each RFID tag, and/or a position of each RFID tag in a building), topographic information (for example, crossroads, intersections of three streets, elevators, and stairs), data used to interlock the RFID tag information and the GIS information, and/or information used to describe the position of each RFID tag, for each area.

The GIS database 143 may include the GIS information (for example, information on maps, structures, and topographies) that is associated with the list of RFID tags included in the navigation database 141.

In addition to the navigation database 141 and the GIS database 143, the storage unit 140 may store system software (for example, RFID middleware) including an operation sequence required for the operation of the navigation apparatus 100 or information related to control, or data.

The communication interface 150 allows the navigation apparatus 100 and the external apparatus to exchange data with each other under control of the control unit 130. Specifically, the communication interface 150 sets wireless and/or wire connection with the external apparatus, and receives data from the external apparatus through a wireless and/or wire interface and provides the received data to the control unit 130. The communication interface 150 transmits data provided from the control unit 130 to the external apparatus.

The display unit 160 may be, for example, a liquid crystal display (LCD) device or an organic light-emitting diode (OLED) device, and displays the current position of the navigation apparatus 100, the GIS information, and/or information indicating the moving direction, which is provided from the control unit 130.

The sound output unit 170 may be, for example, a speaker or an earphone terminal, and outputs information indicating a direction provided from the control unit 130 as a signal in an audible frequency band.

The control unit 130 shown in FIG. 2 can recognize the current position of the navigation apparatus 100 on the moving path reaching the destination by only comparing the information on the RFID tags provided from the RFID reader 120 with the list of RFID tags included in the navigation database 141, when the navigation operation starts.

For example, when the navigation apparatus 100 performs the navigation operation in the predetermined building, the control unit 130 receives the information on the RFID tags 11, 13, and 15 from the RFID reader 120, and searches RFID tag information matched with the received information on the RFID tags 11, 13, and 15 from the navigation database 141 that includes the list of RFID tags installed in the predetermined building. Then, the control unit 130 recognizes the floor and the position (for example, a corridor, a staircase, or an inner portion of a room) where the navigation apparatus 100 is disposed in the predetermined building on the basis of positional information included in the searched RFID tag information, and displays the recognized positional information through the display unit 160.

However, if the position of the navigation apparatus 100 is displayed using only the positional information included in the RFID tag information, the current position of the navigation apparatus 100 is not accurately displayed but is approximately displayed.

For example, when the current position of the navigation apparatus 100 is recognized using only the positional information included in the RFID tag information, it is possible to recognize only that the navigation apparatus 100 is disposed in any room of the building. Therefore, it is impossible to accurately recognize the place in the building where the navigation apparatus 100 is disposed.

In order to solve the above-described problems, the navigation apparatus 100 according to this embodiment recognizes the current position of the navigation apparatus 100 using the distances between the RFID tags and the navigation apparatus 100, installation directions of the recognized RFID tags, and positional information of the RFID tags included in the RFID tag information, on the basis of the RFID tag information provided from the RFID reader 120 and the electric field strength information provided from the reception strength measuring module 121.

Figure 4:
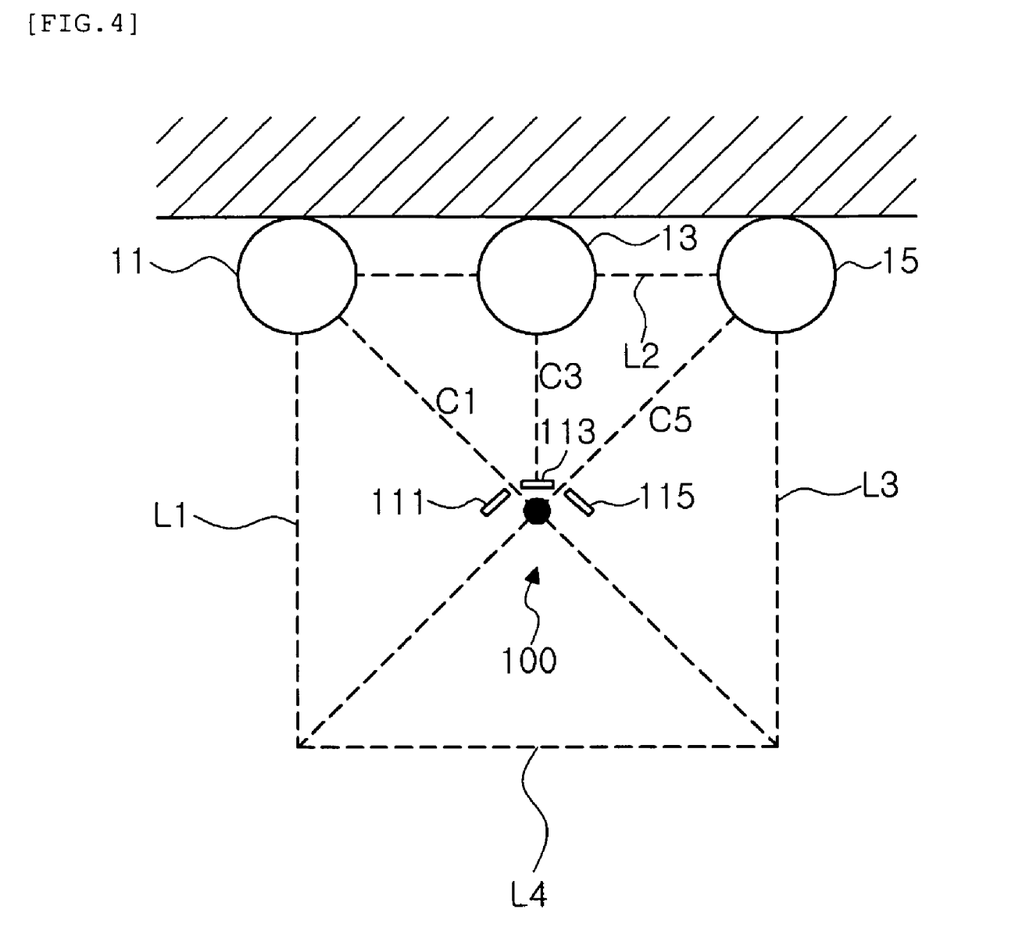
FIG. 4 is a conceptual diagram illustrating a position detecting process of a navigation apparatus using RFID according to an embodiment of the invention.

FIG. 4 is a conceptual diagram illustrating a position detecting process of a navigation apparatus using RFID according to an embodiment of the invention.

Referring to FIG. 4, the control unit 130 detects the position of the navigation apparatus 100 using the proper tag recognition distance. The proper tag recognition distance means the maximum distance at which the RFID reader 120 can recognize the radio signals transmitted from the RFID tags 11, 13, and 15. The control unit 130 uses the electric field strength information provided from the reception strength measuring module 121 of the RFID reader 120 to measure the distances between the navigation apparatus 100 and the RFID tags. The control unit 130 determines an installation direction of an RFID tag, which has transmitted a radio signal, having the strongest electric field strength, among the radio signals received from at least one RFID tag, as the same direction as a direction where the antenna having received the radio signal has directivity. The control unit 130 uses the installation direction of the RFID tag to recognize the current position of the navigation apparatus 100.

Specifically, on the basis of the electric field strength information that is provided from the reception strength measuring module 121 of the RFID reader 120, the control unit 130 recognizes that the electric field strength of the radio signal transmitted from the RFID tag 13 is strongest among the radio signals from the RFID tags 11, 13, and 15 received by the antenna 113. The control unit 130 determines that the RFID tag 13 is disposed in a direction where the antenna 113 has directivity, that is, at the center of the front of the navigation apparatus. Further, since the antenna 113 receives all of the radio signals transmitted from the RFID tags 11, 13, and 15, the control unit 130 determines that the RFID tags 11 and 15 are disposed on the front of the navigation apparatus 100.

Further, on the basis of the information on the electric field strength of the radio signals received from the antennas 111 and 115 that is provided from the reception strength measuring module 121, the control unit 130 determines that the RFID tag 11 is disposed in a direction where the antenna 111 has directivity and the RFID tag 15 is disposed in a direction where the antenna 115 has directivity. Then, the control unit 130 synthesizes the obtained information and determines that the RFID tag 13 is disposed at the center of the front of the navigation apparatus 100, the RFID tag 11 is disposed at the left of the front, and the RFID tag 15 is disposed at the right of the front.

Next, the control unit 130 uses the proper tag recognition distance to measure the distances between the navigation apparatus 100 and the RFID tags 11, 13, and 15. For example, if the antennas 111, 113, and 115 receive the radio signals from the RFID tags 11, 13, and 15, respectively, the control unit 130 determines that the navigation apparatus 100 is located within the proper tag recognition distance set in advance.

The control unit 130 calculates the distances C1, C3, and C5 between the navigation apparatus 100 and the RFID tags 11, 13, and 15 on the basis of the electric field strength information on each of the RFID tags 11, 13, and 15 provided from the reception strength measuring module 121.

The control unit 130 uses the distances C1, C3, and C5 between the navigation apparatus 100 and the RFID tags 11, 13, and 15 to calculate the distance L2 between the RFID tag 11 and the RFID tag 15. The control unit 130 sets the distance L4 having the same dimension as the distance L2 at the same distance as the distance C2 between the navigation apparatus 100 and the RFID tag 13 at the rear of the navigation apparatus 100.

Further, the control unit 130 connects the distance L2 and the distance L4 at the distance C3 from the navigation apparatus 100 at the left of the navigation apparatus 100 to generate the distance L1. In the same method, the control unit 130 generates the distance L3 at the right of the navigation apparatus 100.

The control unit 130 virtually generates the distances L1, L2, L3, and L4 through the above-described process. In addition, the control unit 130 determines that the navigation apparatus 100 is located at the center of a region of a rectangle formed by the virtual distances L1, L2, L3, and L4, and displays the determined position of the navigation apparatus 100 through the display unit 160.

Figure 5:
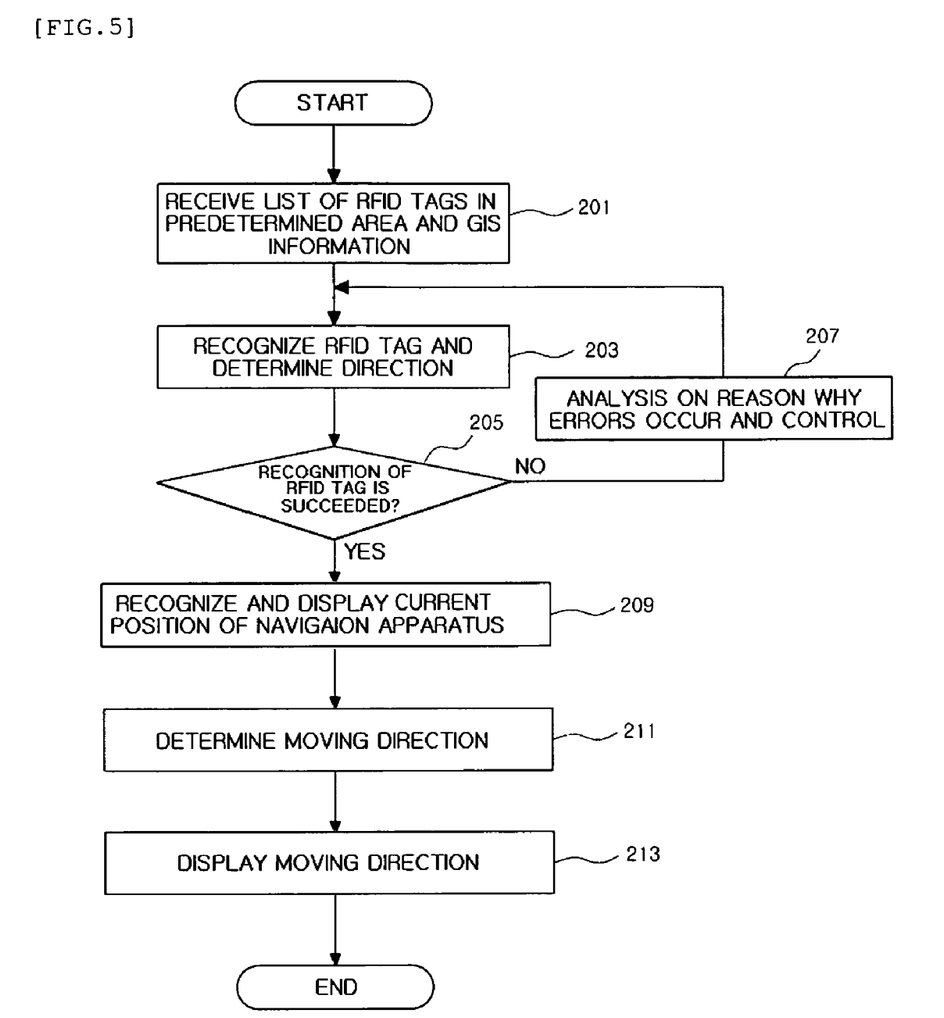
FIG. 5 is a flowchart illustrating an operation process of a navigation method using RFID according to an embodiment of the invention.

FIG. 5 is a flowchart illustrating an operation process of a navigation method using RFID according to an embodiment of the invention. In this case, it is assumed that the navigation apparatus enters a predetermined area after being initialized.

Referring to FIG. 5, first, the control unit 130 receives the list of RFID tags and/or the GIS information in a predetermined area from the external apparatus (for example, local information informing system) through the communication interface 150 (Step S201). In this case, the list of RFID tags includes positional information of the predetermined area. The GIS information may include the geographic coordinates, a geographical name with meanings, and topographic information at the position at which each of the RFID tags is installed. The geographic coordinates mean positional information actually used, such as the coordinates on the map or a number of a building zone. The geographical name with meanings means a representative building name or geographical name, in addition to the coordinates on the map. The topographic information indicates straight roads, curved roads, intersections of three streets, and crossroads, that is, topographic characteristics of the positions where the RFID tags are installed.

The control unit 130 receives the list of RFID tags and the GIS information provided from the external apparatus through the communication interface 150 and stores the list of RFID tags and the GIS information in the navigation database 141 and the GIS database 143, respectively.

Then, the control unit 130 controls the RFID reader 120, sequentially activates the directional antennas 111, 113, and 115 included in the antenna unit 110 to recognize the RFID tags, and determines the directions of the RFID tags (Step S203).

According to another embodiment of the invention, an antenna having a beamforming function or a smart antenna is used instead of the directional antennas 111, 113, and 115 to recognize the RFID tags, thereby determining the directions of the RFID tags.

Then, the control unit 130 determines whether the RFID tags are normally recognized on the basis of the information on the RFID tags provided from the RFID reader 120 (Step S205).

For example, on the basis of the information on the RFID tags provided from the RFID reader 120, when an excessively large amount of information on RFID tags is included in the digital signals or the RFID tags are not recognized at all, the control unit 130 determines that the RFID tags are not normally recognized and errors occur.

When it is determined in Step S205 that errors occur in the process of recognizing RFID tags, the control unit 130 analyzes the reason why the errors occur during the process of recognizing RFID tags, and controls the setting of the RFID reader 120 according to the analyzed result (Step S207). In this case, the control unit 130 determines the reason why errors occur by referring to error determination and control measures stored in advance in the storage unit 140, when the errors occur in the process of recognizing RFID tags, and controls the setting of the RFID reader 120.

For example, when RFID tags of more than the predetermined number are recognized, directional angles of the directional antennas 111, 113, and 115 are set to excessively large values or the transmission output of the directional antennas is too strong. As a result, there is a possibility that the RFID tags are recognized exceeding the predetermined range. Thus, the control unit 130 lowers the transmission output of the directional antennas and the process returns to Step S203 to perform the recognition of the RFID tags again.

When the RFID tags are not recognized at all or the proper tag recognition distance is not set, there is a possibility that errors occur in the directions where the directional antennas 111, 113, and 115 have directivity or the recognition power of the directional antennas 111, 113, and 115 is set to an excessively small value. Thus, the control unit 130 controls the recognition power of each of the directional antennas respectively installed in the corresponding directions to be increased, and the process returns to Step S203 to perform the recognition of the RFID tags again.

When the information on the recognized RFID tag (for example, an unique identification number and geographic coordinates of the RFID tag) is not included in the list of RFID tags included in the navigation database 141, or incorrect information is acquired from the recognized RFID tag, the process returns to Step S203 to perform the recognition of the RFID tag again. When it is determined that errors occur in the list of RFID tags included in the navigation database 141, the control unit 130 may inform the external apparatus (for example, local information informing system), which provides the list of RFID tags through the communication interface 150, of the fact that the error occurs, or update the RFID tag information included in the navigation database 141.

Here, when errors continuously occur in recognizing the RFID tags even after the setting of the RFID reader 120 is controlled again in Step S207, the control unit 130 may display an error message through the display unit 160.

When it is determined in Step S205 that the recognition of the RFID tags is normally performed, the control unit 130 recognizes the current position of the navigation apparatus 100 on the basis of the positions of the recognized RFID tags, the proper tag recognition distance, and the electric field strength information, reads the GIS information corresponding to the recognized current position from the GIS database 143, and simultaneously displays the current position of the navigation apparatus 100 and the GIS information through the display unit 160 (Step S209).

Then, the control unit 130 refers to the list of RFID tags stored in the navigation database 141 and reads information on a next RFID tag installed on the moving path from the current position at which the navigation apparatus 100 is disposed to the destination. Then, the control unit 130 determines the direction where the RFID tag corresponding to the read information on the RFID tag is installed as the moving direction (Step S211).

Then, the control unit 130 displays the set moving direction through the display unit 160 (Step S213). Alternatively, the control unit 130 may display the moving direction through the display unit 160 and instruct the moving direction by outputting the sound through the sound output unit 170.

In Steps S209 and S213, when the control unit 130 displays the current position and the moving direction of the navigation apparatus 100, the control unit 130 interlocks the positional information and the GIS information with each other, such that the current position and the moving direction and the GIS information corresponding to the current position and the moving direction are simultaneously displayed through the display unit 160.

In Steps S209 and S213, the control unit 130 reads the topologic information corresponding to the current position and the moving direction of the navigation apparatus 100 from the GIS database 143 and displays it through the display unit 160, thereby improving accuracy and usability of the navigation apparatus 100.

For example, it is assumed that the RFID tags are provided at predetermined intervals along the right wall of the straight road and the navigation apparatus 100 moves straight at the predetermined distance from the wall. In this case, when the topologic information is displayed, the information, which indicates that the road on which the navigation apparatus 100 moves at the present time is a straight road and the movement to the right side is forbidden, is displayed. As a result, it is possible to improve accuracy of the navigation apparatus 100. If the RFID tag information included in the list of RFID tags installed on the moving path from the current position to the destination is received through the antennas provided to have directivity at the center of the front of the navigation apparatus 100 and the right of the front, like the antennas 113 and 115, it can be determined that a direction where the navigation apparatus 100 moves at the present time is correct.

Figure 6:
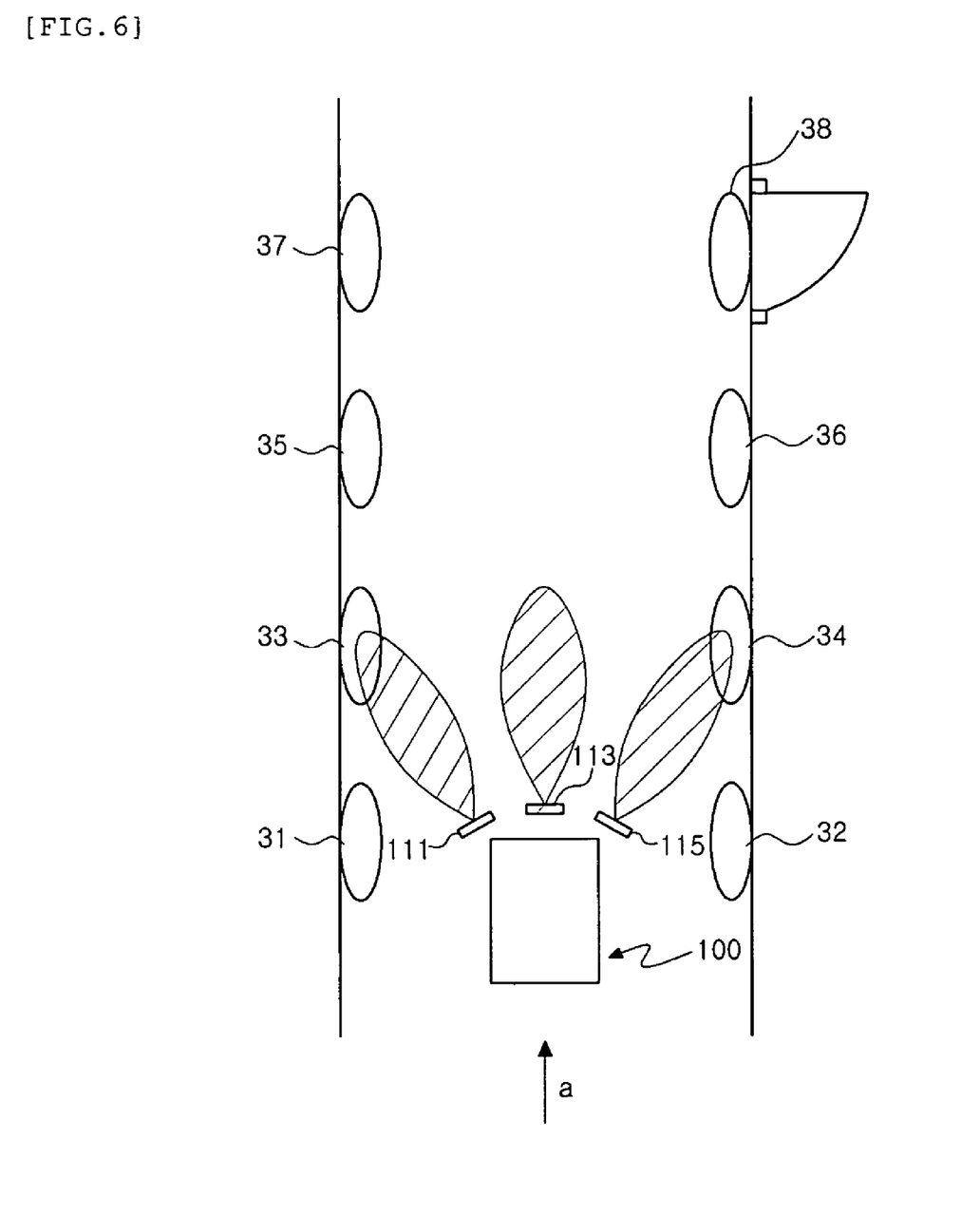
FIG. 6 is a conceptual diagram illustrating an application example of a navigation apparatus using RFID according to an embodiment of the invention.

FIG. 6 is a conceptual diagram illustrating an application example of a navigation apparatus using RFID according to an embodiment of the invention, which illustrates the operation of the navigation apparatus in a straight zone.

Referring to FIG. 6, RFID tags 31, 33, 35, and 37 are provided at the left side of the straight road and RFID tags 32, 34, 36, and 38 are provided at the right side thereof. The directional antenna 111 that is provided in the navigation apparatus 100 sequentially receives the radio signals transmitted from the RFID tags 31, 33, 35, and 37 as the navigation apparatus 100 moves along a predetermined direction a. At the same time, the directional antenna 115 sequentially receives the radio signals transmitted from the RFID tags 32, 34, 36, and 38 as the navigation apparatus 100 moves along the predetermined direction a.

The control unit 130 of the navigation apparatus 100 determines the positions of the RFID tags on the basis of the RFID tag information and the electric field strength information provided from the RFID reader 120. Specifically, the control unit 130 determines that the RFID tags 31, 33, 35, and 37 are located at the left side of the navigation apparatus 100 and the RFID tags 32, 34, 36, and 38 are located at the right side of the navigation apparatus 100. The control unit 130 recognizes the current position of the navigation apparatus 100 and displays it through the display unit 160.

As the navigation apparatus 100 moves along the predetermined direction a, the control unit 130 compares the information on the recognized RFID tags with the list of RFID tags in the navigation database 141 and determines the moving direction. The control unit 130 allows the display unit 160 to display the determined moving direction and additional information (for example, topologic information) corresponding to the RFID tags.

For example, in the case in which a gate exists next to the RFID tag 38, if the control unit 130 recognizes the RFID tags 37 and 38 while the navigation apparatus 100 moves along the predetermined direction a, the control unit 130 compares the information on the recognized RFID tags 37 and 38 with the list of RFID tags in the navigation database 141 and reads the information on the RFID tag 38, and displays gate information included in the read information on the RFID tag through the display unit. In this case, the control unit 130 may search the GIS database 143 and read and displays the topologic information corresponding to the RFID tag 38.

Figure 7:
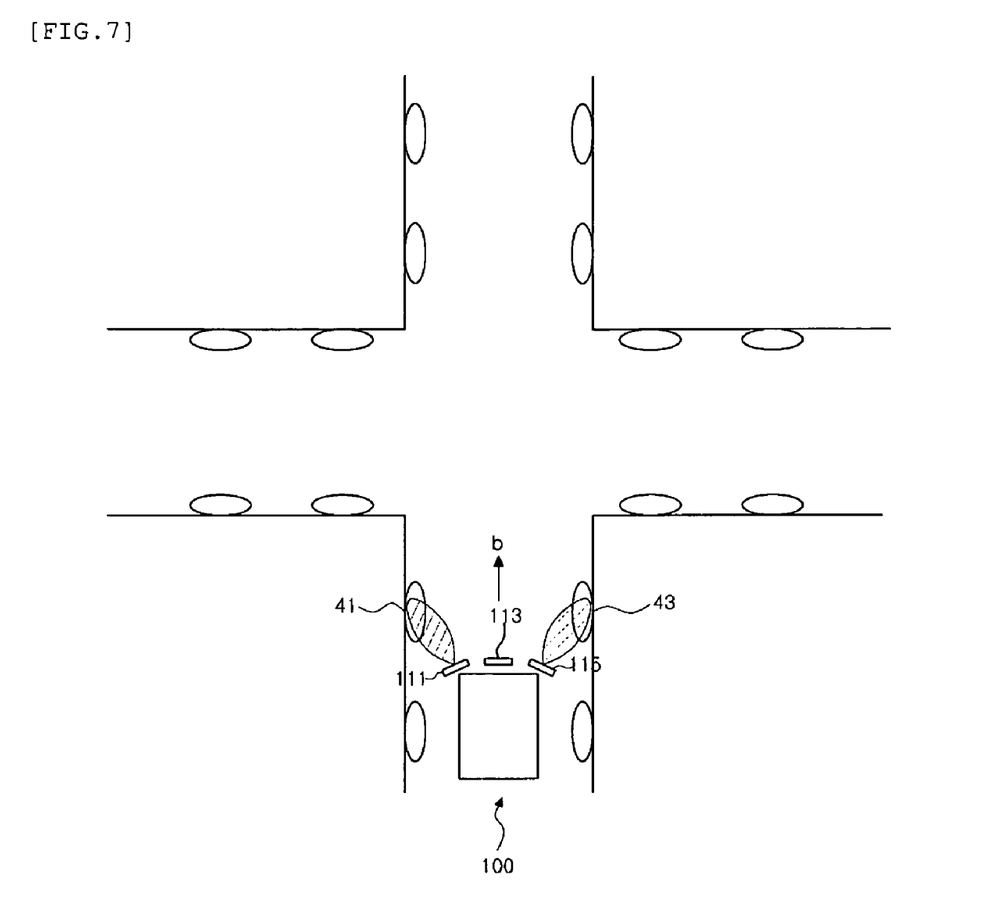
FIG. 7 is a conceptual diagram illustrating another application example of a navigation apparatus using RFID according to an embodiment of the invention.

FIG. 7 is a conceptual diagram illustrating another application example of a navigation apparatus using RFID according to an embodiment of the invention, which illustrates the operation of the navigation apparatus on the crossroads.

Referring to FIG. 7, when the RFID tags are provided at both sides of each access road of the crossroads and the navigation apparatus 100 moves along the predetermined direction b, the directional antenna 111 that is provided in the navigation apparatus 100 receives the radio signal that is transmitted from the RFID tag 41 provided at the left side of the access road, and the directional antenna 113 receives the radio signal that is transmitted from the RFID tag 42 provided at the right side of the access road.

The control unit 130 is provided with the information on the RFID tags 41 and 43 received from the RFID reader 120, and uses the topographic information included in the provided information on the RFID tags or searches the GIS information corresponding to the provided information on the RFID tags from the GIS database 143, and recognizes that the crossroads exist in front of the current position of the navigation apparatus 100.

Further, the control unit 130 is provided with the information on the RFID tags 41 and 43 received from the RFID reader 120, compares the provided information on the RFID tags with the list of RFID tags in the navigation database 141, and determines the moving direction.

For example, the control unit 130 may determine the moving direction as going straight when the information on the RFID tags 41 and 43 is included in the list of RFID tags, and the moving direction as turning to the left when only the information on the RFID tag 41 is included in the list of RFID tags. Further, the control unit 130 may determine the moving direction as turning to the right when only the information on the RFID tag 42 is included in the list of RFID tags.

FIGS. 6 and 7 exemplify the straight road and the crossroads as an application example of the navigation, but the invention is not limited thereto. The navigation apparatus 100 according to this embodiment may be applied to all topographies including the straight road and the crossroads.

For example, when the topologic information is included in the RFID tag provided in the topography of the predetermined area, the navigation apparatus 100 is provided with the topographic information from the corresponding RFID tag. Then, on the basis of the provided topographic information, the navigation apparatus 100 determines the moving direction in the current topography, and displays the topographic information and the moving direction.

The navigation apparatus using RFID according to this embodiment uses a variety of information included in the RFID tags and functions as a walking navigation apparatus that is used to describe a geographic feature in a specific building, such as a museum or a public institution, or a guide navigation apparatus that sets only a small area, such as a national park, and serves as a guide.

Since the navigation apparatus using RFID according to this embodiment displays the precise position and the moving direction, it is available for the purpose of guiding severely handicapped persons or visually handicapped persons using an electrically-powered wheelchair to the destination, or enabling a user to easily search desired products or books at a grand mart or a library.

As described above, the navigation apparatus and method according to the embodiments of the invention, on the basis of the information on RFID tags and the electric field strength of the radio signals received from at least one directional antenna, detects the current position of the navigation apparatus, compares the information on the recognized RFID tags with the list of RFID tags in the navigation database to read RFID tag information matched with the list of RFID tags, determines the direction where the RFID tag corresponding to the read RFID tag information is installed as the moving direction, and simultaneously displays the current position and the determined moving direction together with the GIS information.

Accordingly, the directional antenna is used to receive the radio signals from the RFID tags and the positional information of the RFID tags and the electric field strength information of the radio signals are used to accurately detect the current position and the moving direction of the navigation apparatus, thereby accurately guiding the moving path from the current position to the destination.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

What is claimed is:

1. A navigation apparatus using RFID, comprising:
   an antenna unit that has directivity in a predetermined direction, and is configured to receive at least one radio signal transmitted from at least one RFID tag;
   an RFID reader that is configured to convert the at least one radio signal provided by the antenna unit into information on the at least one RFID tag in a digital form, to measure a reception strength of the at least one radio signal, and to provide the information on the at least one RFID tag and information on the reception strength; and
   a control unit that is configured to determine a current position and a moving direction on the basis of the information on the at least one RFID tag and the information on the reception strength provided by the RFID reader,
   wherein the control unit is configured to interlock the current position and the moving direction, with GIS (Geographic Information System) information corresponding to the current position and the moving direction, and to display the current position and the moving direction together with the GIS information.

2. The navigation apparatus of claim 1,
   wherein the control unit is configured to extract the distance between the at least one RFID tag and the navigation apparatus and a direction where the at least one RFID tag is disposed on the basis of the information on the reception strength and to determine the current position based on the extracted distance and direction and positional information of the at least one RFID tag included in the information on the at least one RFID tag.

3. The navigation apparatus of claim 1,
   wherein the control unit is configured to compare the information on the at least one RFID tag with a list of RFID tags provided on a moving path to a destination, to read RFID tag information matched with the list of RFID tags among the information on the at least one RFID tag, and to determine the moving direction on the basis of a direction where the RFID tag corresponding to the read RFID tag information is installed.

4. The navigation apparatus of claim 1,
   wherein the information on the reception strength indicates the reception electric field strength of the at least one radio signal received from the antenna unit.

5. The navigation apparatus of claim 1,
   wherein the antenna unit includes three directional antennas that are respectively installed to have directivity in different directions at the front of the navigation apparatus and at an angle in a range of 45 to 90 degrees with respect to the front.

6. The navigation apparatus of claim 1,
   wherein the antenna unit is one of an antenna having a beam-forming function capable of radiating radio waves in a desired direction or receiving the radio waves from the desired direction, or a smart antenna.

7. The navigation apparatus of claim 1,
   wherein the information on the at least one RFID tag includes at least one of unique identification information of the RFID tag, installation position information thereof, and GIS (Geographic Information System) information.

8. The navigation apparatus of claim 1, further comprising:
   a display unit that is configured to receive the current position and the moving direction from the control unit, and to display the current position and the moving direction;
   a storage unit that is configured to store a list of RFID tags installed on a moving path to a destination and GIS (Geographic Information System) information corresponding to the list of RFID tags; and
   a communication interface that is configured to establish connection with an external apparatus, and to provide data received from the external apparatus to the control unit.

9. The navigation apparatus of claim 8,
   wherein the list of RFID tags includes at least one of positional information and topologic information of each of the RFID tags, data used to interlock the information of each of the RFID tags with its corresponding GIS information, and information used to describe a position of each of the RFID tags.

10. A navigation method using RFID that guides a current position and a moving direction to the destination, the navigation method comprising:
    recognizing at least one RFID tag using an antenna unit and an RFID reader;
    recognizing the current position of the navigation apparatus on the basis of information on the at least one RFID tag and information on the reception strength of a radio signal transmitted from the at least one RFID tag using the antenna unit and the RFID reader;
    comparing the information from the at least one RFID tag with a list of RFID tags installed on a moving path to a destination using a control unit; and
    determining the moving direction of the navigation apparatus using the control unit,
    wherein the recognizing of the current position includes simultaneously displaying the recognized current position and GIS (Geographic Information System) information corresponding to the recognized current position.

11. The navigation method of claim 10,
    wherein the recognizing of the current position includes extracting the distance between the at least one RFID tag and the navigation apparatus and a direction where the at least one RFID tag is disposed on the basis of the information on the reception strength, and using the extracted distance and direction and positional information of the at least one RFID tag included in the information on the at least one RFID tag to recognize the current position.

12. The navigation method of claim 10,
    wherein the determining of the moving direction includes comparing the information on the at least one RFID tag with the list of RFID tags provided on the moving path to the destination, reading RFID tag information matched with the list of RFID tags among the information on the at least one RFID tag, and determining the moving direction on the basis of a direction where the RFID tag corresponding to the read RFID tag information is installed.

13. The navigation method of claim 10,
wherein the determining of the moving direction includes simultaneously displaying the determined moving direction and GIS (Geographic Information System) information corresponding to the determined moving direction.

14. The navigation method of claim 10, further comprising:
receiving a list of RFID tags in a predetermined area and GIS (Geographic Information System) information from an external apparatus.

15. The navigation method of claim 10,
wherein, when an error occurs in recognizing the at least one RFID tag, the error is corrected on the basis of error determination and control measures stored in advance, and the recognizing of the at least one RFID tag is performed again.

* * * * *